United States Patent [19]
Fujita et al.

[11] Patent Number: 5,060,212
[45] Date of Patent: Oct. 22, 1991

[54] INTEGRATED OPTICAL PICK-UP DEVICE

[75] Inventors: Kazuhiro Fujita; Toshiyuki Inokuchi; Nobuyuki Baba; Hideo Maeda, all of Yokohama; Shigeru Ohuchida, Zama, all of Japan

[73] Assignee: Ricoh Company, Ltd., Tokyo, Japan

[21] Appl. No.: 232,321

[22] Filed: Aug. 15, 1988

[30] Foreign Application Priority Data

| Aug. 17, 1987 | [JP] | Japan | 62-125084[U] |
| Aug. 17, 1987 | [JP] | Japan | 62-125085[U] |
| Oct. 8, 1987 | [JP] | Japan | 62-254475 |
| Oct. 15, 1987 | [JP] | Japan | 62-260696 |

[51] Int. Cl.$^5$ .............................................. G11B 7/00
[52] U.S. Cl. .................................. 369/44.12; 369/112
[58] Field of Search .................... 369/44.12, 44.24, 112

[56] References Cited

U.S. PATENT DOCUMENTS

| 4,422,168 | 12/1983 | Ito et al. | 369/44.12 |
| 4,626,679 | 12/1986 | Kuwayama et al. | 369/44.12 |
| 4,689,780 | 8/1987 | Ohara et al. | 369/44.12 |
| 4,730,297 | 3/1988 | Ishibashi et al. | 369/112 |
| 4,797,868 | 1/1989 | Ando | 369/44.12 |

FOREIGN PATENT DOCUMENTS 62-67735  3/1987  Japan ............................. 369/44.24

Primary Examiner—Donald McElheny, Jr.
Attorney, Agent, or Firm—Cooper & Dunham

[57] ABSTRACT

An optical pick-up device for use in an optical disc information recording/reproducing apparatus is provided. In the present optical pick-up device, the functions of two or more separate optical elements provided in the prior art structure are combined or integrated in a single element to reduce the total number of separate optical elements provided in the device. In particular, use is made of a diffraction grating rather than lenses and/or lenses are formed as holo lenses. A diffraction grating and a holo lens may be formed substantially in the shape of flat plates, to define an optical components can be put together to define an integrated subassembly, which reduces the total number of discrete elements, facilitates manufacturing and eliminates the necessity of adjustments among optical elements once set.

10 Claims, 9 Drawing Sheets

Fig. 23
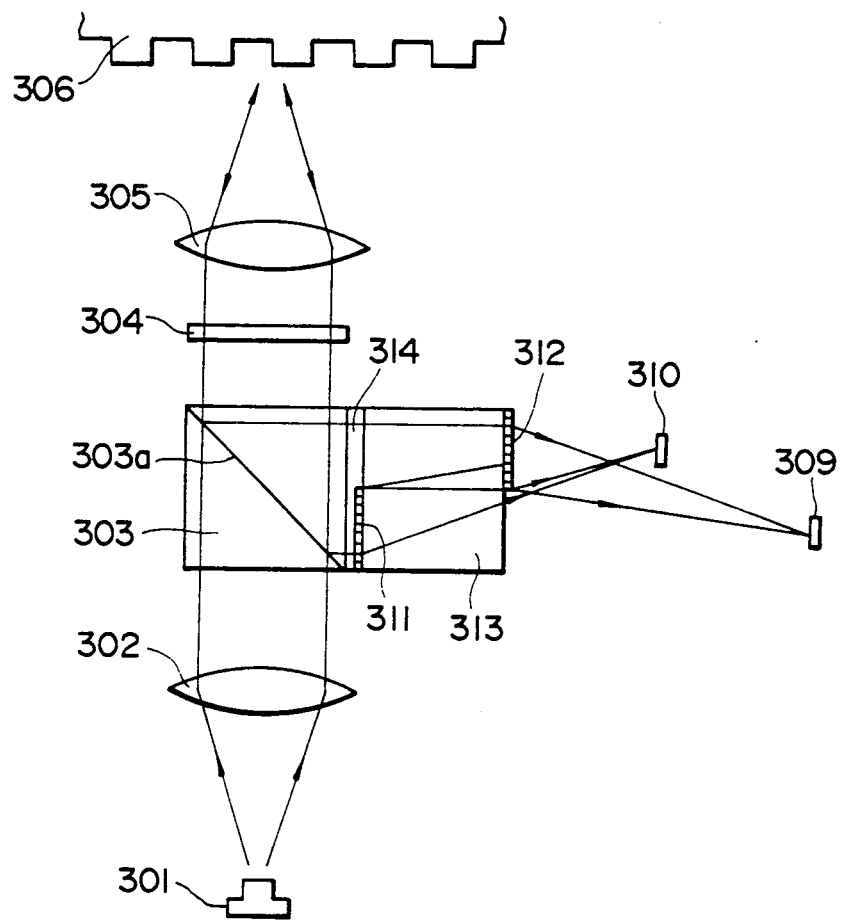
Fig. 24  Fig. 25  Fig. 26
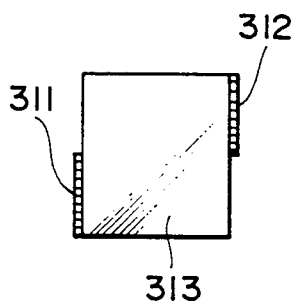 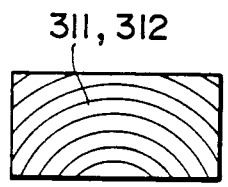 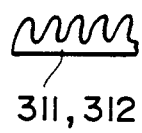

INTEGRATED OPTICAL PICK-UP DEVICE

BACKGROUND OF THE INVENTION

1. Field of the Invention

This invention generally relates to an optical information recording/reproducing apparatus, and, in particular, to an apparatus for recording or reproducing information on or from an optical disc.

2. Description of the Prior Art

A typical prior art optical pick-up for use in an optical information recording/reproducing apparatus, in which information is eraseably recorded on an optical disc, is illustrated in FIG. 4. As shown, the optical pick-up includes a movable optical system 5 which is provided to be movable in the radial direction of an optical disc 1, on which information is eraseably recorded, and which includes an objective lens 2 located opposite to a recording surface of the optical disc 1, a writing coil 3 which is energized when writing information on the optical disc 1, and a light deflecting prism 4. The optical pick-up also includes a stationary optical system 7 which is mounted on a support plate 6 which in turn is fixedly attached to a frame of the optical information recording/reproducing apparatus. In the illustrated example, the stationary optical system 7 includes an illumination optical system 8, a servo optical system 9 and an information (opto-magnetic information) detecting system 10.

In the illumination optical system 8, a laser beam emitted from a semiconductor laser 11 is collimated by a collimator lens 12 and this collimated laser beam is passed through a pair of triangular prisms 13 and 14 to thereby have the laser beam shaped such that it has a circular cross section. This is because, the semiconductor laser typically used as a light source in this type of apparatus emits a light beam which is not circular in cross section but generally elliptic in cross section, having an angle $\theta_p$ of 10° to 20° in terms of half-width angle in the direction parallel to the pn junction of semiconductor laser and an angle $\theta_n$ of 20° to 40° in the direction normal to the pn junction of the semiconductor laser Thus, such an elliptic laser beam is changed to a circular laser beam by means of the pair of triangular prisms 13 and 14. Then, the laser beam thus reshaped is introduced into a polarization beam splitter 15 for separating incident light from reflected light, which is provided with a polarizing surface 15a for transmitting 100% of p polarized light and reflecting ⅔ of s polarized light. Thus, only the s polarized light component is reflected by the polarizing surface 15a toward the movable optical system 5, so that this s polarized light is deflected by the prism 4 to be focused onto the recording surface of the optical disc 1 through the objective lens 2.

Then, the light reflected from the recording surface of the optical disc 1 is rotated in one (positive) direction or the other (negative) direction around the optical path over a predetermined polarization angle depending on the state of information recorded on the optical disc 1, and due to such rotation, the reflected light beam includes a p polarized light component. The reflected light returns to the stationary optical system by following the same optical path and thus it is deflected by the deflection prism 4 to propagate toward the polarization beam splitter 15 and then toward a servo/information detecting light separating polarization beam splitter 16. That portion of the s polarized light component which is reflected by the polarization beam splitter 16 toward the servo detecting system 9 passes through a detection lens 17 and a knife edge prism 18 to impinge upon a tracking light-receiving device 19 and a focusing light-receiving device 20. On the other hand, the light which propagates straight by passing through the polarization beam splitters 15 and 16 includes the remaining portion of the s polarized component and p polarized light enters into the information detecting optical system 10. When this light passes through a half wavelength plate 21 after the polarization beam splitter 16, its plane of polarization is rotated over 45°. Then, the light further passes through a Wollaston polarizing prism 22 to be split into a p polarized light component and a s polarized light component, which are then focused onto a light-receiving device 24 by means of a detection lens 23, whereby the direction of polarization is detected to determine the presence and absence of an information signal.

In the above-described prior art structure, the laser beam emitted from the semiconductor laser 11 is first collimated by the collimating lens 12 and then the thus collimated laser beam is reshaped by the pair of triangular prisms 13 and 14 so as to form a laser beam circular in cross section or circularly symmetrical in light intensity distribution. In this case, as shown in FIG. 5, in order to change the size $D_1$ of the incident beam in one direction to a desired size $D_0$ of the output beam in the same direction, two prisms 13 and 14 having the same apex angle are combined with a predetermined angular relationship therebetween. Accordingly, in the illustrated structure, the pair of prisms 13 and 14 must be properly located with respect to the collimator lens 12 and the relative angular relation between the pair of prisms 13 and 14 must be set properly.

As shown in FIGS. 6 and 7, as an alternative structure, use may be made of a pair of cylindrical lenses 25 and 26 for reshaping a laser beam. FIG. 6 shows such a pair of cylindrical lenses when viewed in the direction where no lens action is present in FIG. 7 illustrates such a pair when viewed in the direction where a lens action is present. In this case, use is made of a pair of cylindrical lenses 25 and 26 having focal distances $f_1$ and $f_2$, respectively, and they are arranged with their focal points located at the same location on the common optical axis. The focal distances $f_1$ and $f_2$ are determined such that the incident light beam having a size $D_1$ in one direction is converted into an output light beam having a desired size $D_0$ in the same direction. However, such a structure also requires the provision of two lenses which must be spaced apart over a predetermined distance. Furthermore, the structure shown in FIG. 4 includes a relatively large number of components, and thus it is relatively difficult to manufacture and the overall structure tends to be large in size.

SUMMARY OF THE INVENTION

In accordance with one aspect of the present invention, there is provided an optical pick-up device for use in an optical information recording/reproducing apparatus, which comprises a light source for emitting a light beam and an optical system for leading said light beam to a recording medium and leading light reflected from said recording medium to detecting means, wherein the optical system includes a triangular prism having a first surface for receiving said light beam emitted from said light source and a second surface which is inclined at an angle with respect to said first surface and is provided with a diffraction grating for outputting said light beam in a direction parallel with the direction of said light beam incident upon said first surface.

In accordance with another aspect of the present invention, there is provided an integrated optical pick-up device for use in an optical information recording/reproducing apparatus, which comprises a light source, preferably a semiconductor laser, for emitting a light beam and an optical system for guiding the light beam to a recording medium and guiding light reflected from the recording medium to a servo signal detecting means and also to an information signal detecting means, wherein said optical system includes a first beam splitting means for splitting the light beam received from the light source into three light beams and a second beam splitting means for splitting the light reflected from the recording medium into a beam for the servo signal detecting means and another beam for the information signal detecting means. In the preferred embodiment, the servo signal detecting means includes a focusing signal detecting device and a tracking signal detecting device. Preferably, the optical system includes a stationary optical system fixed in position with respect to the recording medium and a movable optical system movable relative to the recording medium and also to the stationary optical system, and the stationary optical system is an integrated unit with all of the components fixedly attached in one unit.

In accordance with a further aspect of the present invention, there is provided an integrated optical pick-up device for use in an optical information recording/reproducing apparatus, which comprises a light source, preferably a semiconductor laser, for emitting a light beam and an optical system for guiding the light beam to a recording medium and guiding light reflected from the recording medium to a servo signal detecting means and also to an information signal detecting means, wherein the servo signal detecting means includes a focusing signal detecting device and a tracking signal detecting device and the optical system includes a first beam splitting means for splitting the light reflected from the recording medium into a beam for the servo signal detecting means and another beam for the information signal detecting means and a second beam splitting means for splitting the beam for the servo signal detecting means into a beam for the focusing signal detecting device and another beam for the tracking signal detecting device. Preferably, the second beam splitting means includes a plate-shaped focusing element and a diffraction grating serving as a knife edge. Preferably, the optical system includes a stationary optical system fixed in position with respect to the recording medium and a movable optical system movable relative to the recording medium and also to the stationary optical system, and the stationary optical system is an integrated unit with all of the components fixedly attached in one unit.

In accordance with a still further aspect of the present invention, there is provided an optical pick-up device for use in an optical information recording/reproducing apparatus, which comprises a light source for emitting a light beam and an optical system for leading the light beam received from the light source to a recording medium and guiding light reflected from the recording medium to a detecting means, wherein the detecting means includes a focusing error detecting device and a tracking error detecting device and the optical system includes a first grating having a focusing function for focusing a first portion of the light reflected from the recording medium onto the focusing error detecting device and a second grating having a focusing function for focusing a second portion of the light reflected from the recording medium onto the tracking error detecting device. Preferably, each of the first and second gratings is a generally circular grating and both of the first and second gratings are fixedly mounted on the same transparent block.

It is therefore a primary object of the present invention to obviate the disadvantages of the prior art as described above and to provide an improved optical pick-up device for use in an optical information recording/reproducing apparatus.

Another object of the present invention is to provide an improved optical pick-up device for use in an optical information recording/reproducing apparatus which is simple in structure, has few separate components, and is easy to manufacture and compact in size.

A further object of the present invention is to provide an improved split-type optical pick-up device for use in an optical information recording/reproducing apparatus, which is fast in operation and thus has short access time.

A still further object of the present invention is to provide an integrated optical pick-up device for use in an optical information recording/reproducing apparatus, which is sturdy in structure and compact in size.

Other objects, advantages and novel features of the present invention will become apparent from the following detailed description of the invention when considered in conjunction with the accompanying drawings.

BRIEF DESCRIPTION OF THE DRAWINGS

FIG. 23 is a schematic illustration showing an optical pick-up device for use in an optical information recording/reproducing apparatus constructed in accordance with a further embodiment of the present invention;

FIG. 24 is a schematic illustration showing the main component provided in the structure shown in FIG. 23;

FIGS. 25 & 26 are illustration showing in plan view the structure of a grating having focusing power;

DESCRIPTION OF THE PREFERRED EMBODIMENTS

Figure 1:
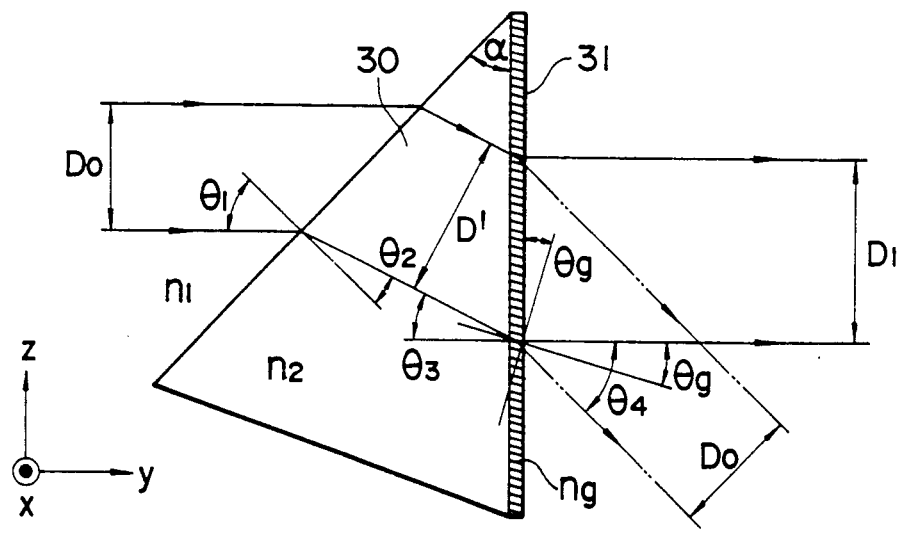
FIG. 1 is a schematic illustration showing a beam reshaping prism of an optical pick-up device for use in an optical information recording/reproducing apparatus constructed in accordance with one embodiment of the present invention.
Figure 2:
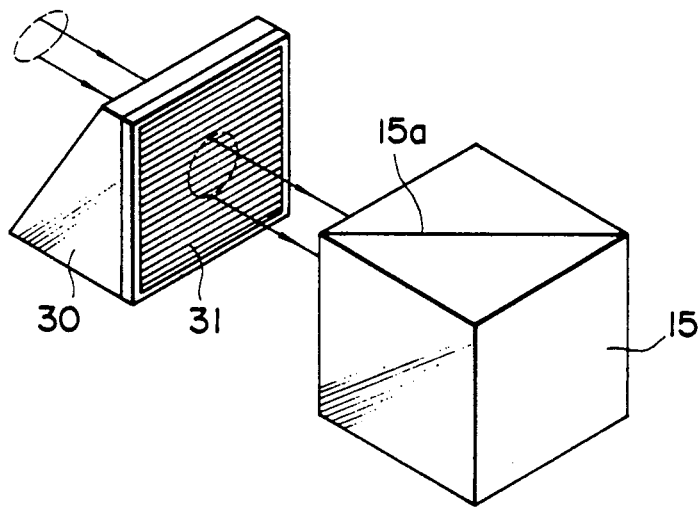
FIG. 2 is a schematic, perspective view showing the relative arrangement between the beam reshaping prism of FIG. 1 and a beam splitter in the optical pick-up device of the present embodiment.
Figure 4:
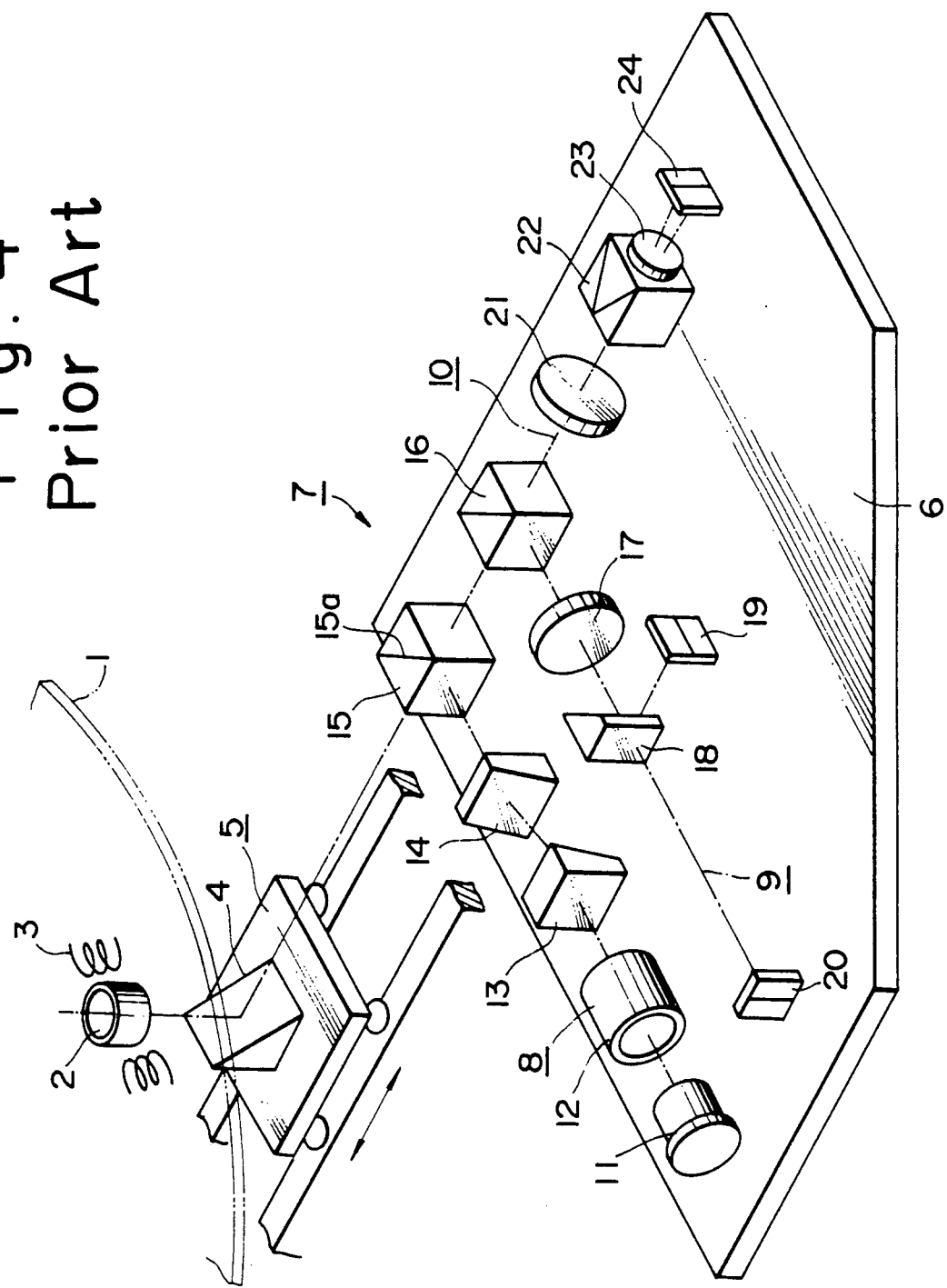
FIG. 4 is a schematic illustration showing a typical prior art split type optical pick-up device including a stationary optical system which is fixed in position relative to an optical disc and a movable optical system which is movable relative to the optical disc.
Figure 5:
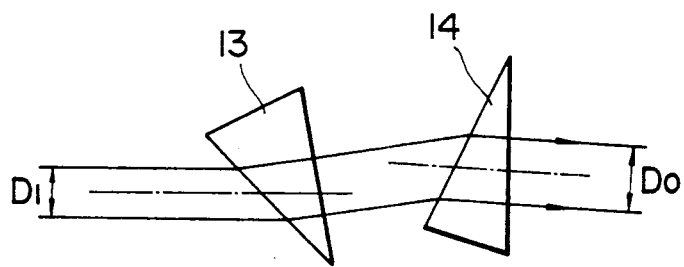
FIG. 5 is a schematic illustration showing a pair of beam reshaping prisms provided in the stationary optical system in the structure shown in FIG. 4.
Figure 6:
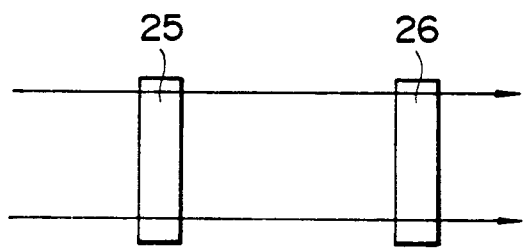
FIGS. 6 and 7 are schematic illustrations showing a pair of cylindrical lenses which may be provided in the structure shown in FIG. 4 in place of the pair of beam reshaping prisms 13 and 14.
Figure 7:
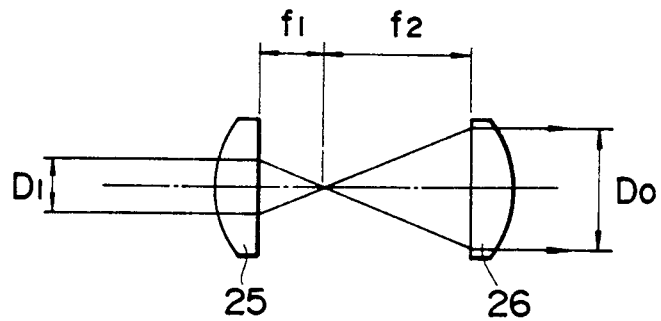

Referring now to FIG. 1, there is schematically shown a beam reshaping device constructed in accordance with one embodiment of the present invention and suitable for use in an optical pick-up device of an optical information recording/reproducing apparatus. When this beam reshaping device is to be used in a split-type optical pick-up device, i.e., an optical pick-up device having a separate optical system which is split between a stationary optical system and a movable optical system as shown in FIG. 4, it replaces the pair of triangular prisms 13 and 14 in the structure shown in FIG. 4. When so provided, the beam reshaping device receives a laser beam which is emitted from the semiconductor laser 11 and is generally elliptic in shape and reshapes the laser beam to a generally circular shape in a far-field pattern. And, the thus reshaped laser beam is passed to the beam splitter 15. In the illustrated embodiment, the beam reshaping device includes a prism 30 having an input surface for receiving the laser beam emitted from the laser 11 and an output surface which is inclined at a predetermined angle with respect to the input surface and a diffraction grating 31 fixedly mounted on the output surface of the prism 30. Thus, the present beam reshaping device has an integrated structure and thus is constructed in one piece.

The principle of beam reshaping function of the present beam reshaping device will now be described with reference to FIG. 1. Here, the direction normal to the plane of the drawing is taken as x direction and the direction of propagation of the laser beam is taken as y direction with the direction normal to both of x and y being taken as z direction. A laser beam emitted from the semiconductor laser 11 is first collimated by the collimator lens 12 and the thus collimated laser beam is generally elliptic in shape and has a long axis having a size or width $D_1$ in x direction and a short axis having a size of width $D_0$ in z direction. It is assumed that the medium surrounding the prism 30 has a refractive index $n_1$ and the material defining the prism 30 has a refractive index $n_2$. The surrounding medium is typically air and, in this case, $n_1 = 1.0$. And, if the material defining the prism 30 is glass, then $n_2 = 1.51$, for example. If the incident laser beam forms an angle $\theta_1$ with the line normal to the input surface of the prism 30, the laser beam propagates within the prism 30 in a direction which is at an angle $\theta_2$ with respect to the line normal to the input surface. Thus, according to the Snell's law, the following relationship holds.

$$n_1 \cdot sin\theta_1 = n_2 \cdot sin\theta_2 \tag{1}$$

Similarly, the laser beam propagating within the prism 30 hits the output surface at an incident angle $\theta_3$ and is output into the surrounding medium at an angle $\theta_4$. This is the function of the prism 30 itself.

However, in the present embodiment, the diffraction grating 31 is integrally formed on the output surface of the triangular prism 30. The diffraction grating 31 is designed to diffract the incident light over the angle $\theta_4$. And, thus, the light propagating through the prism 30 and hitting the output surface at the incident angle $\theta_3$ is diffracted by the diffraction grating 31 over the angle $\theta_4$, so that the thus diffracted laser beam is output in a direction parallel to the direction of propagation of the incident laser beam.

Described in greater detail, assuming the pitch of the diffraction grating 31 to be A, the refractive index to $n_g$, the angle between the grating 31 and the line normal to the output surface of the prism 30 to be $\theta_g$ and the Bragg's angle of the light flux incident upon the diffraction grating 31 to be $\theta_B$, then the following relationship holds.

$$n_2 \cdot sin(\theta_3 - \theta_g) = n_g \cdot sin\theta_B \tag{2}$$
$$= n_1 \cdot sin\theta_g$$

In order to maximize the diffraction efficiency, it is assumed that the diffraction condition satisfies the Bragg's angle $\theta_B$, and, then, if the wavelength in use is denoted by w, we have the following equation.

$$2n_g A sin\theta_B = w \tag{3}$$

From the equations (1) and (2), we have $$\theta_g = sin^{-1}(w/2n_1 A) \tag{4}$$

$$\theta_3 = \theta_g + \sin^{-1}(w/2n_2 A) \tag{5}$$

On the other hand, in the z-y plane, the relation between the input beam width $D_0$ and the output beam width $D_1$ will be developed below. If the beam width within the prism 30 in the z-y plane is $D'$, the following relation holds for the input surface of the prism 30.

$$D_0/\cos \theta_1 = D'/\cos \theta_2 \tag{6}$$

If the apex angle alpha of the prism 30 is equal to the incident angle $\theta_1$, i.e., $$\text{alpha} = \theta_1 \tag{7}$$

then, the output surface of the prism 30 lies in the z-x plane, so that the following equation holds with respect to the output surface of the prism 30.

$$D'/\cos(\theta_1 - \theta_2) = D_1 \tag{8}$$

From equations (6) and (8), we have $$(\cos \theta_1/\cos \theta_2) \cdot \cos(\theta_1 - \theta_2) = D_0/D_1. \tag{9}$$

For example, if beam reshaping of $D_0/D_1 = \frac{1}{2}$ is required, we have alpha $= \theta_1 = 63.1°$ and $\theta_2 = 36.2°$ from equations (1), (7) and (9), so that the following result is obtained.

$$\theta_3 = \theta_2 - \theta_1 = 26.9° \tag{10}$$

And, if the wavelength w in use of the semiconductor laser 11 is 0.78 microns, the pitch A of the diffraction grating may be calculated to be A = 1.39 microns from equations (4), (5) and (10).

In the above-described specific embodiment, the diffraction condition was assumed to satisfy the Bragg's condition. It should be noted, however, that as long as a high diffraction efficiency is obtained, it is not always necessary to satisfy the Bragg's angle condition. As described above, once the beam size ratio $D_0/D_1$ has been set uniquely, the apex angle of the prism 30 and the grating pitch of the diffraction grating 31 are uniquely determined.

The diffraction grating 31 may, for example, be formed by uniformly depositing a photosensitive material on a parallel substrate and applying a two light flux interference method, and then it may be fixedly attached to the output surface of the prism 30. The diffraction grating 31 may be formed by any other desired method.

Figure 3:
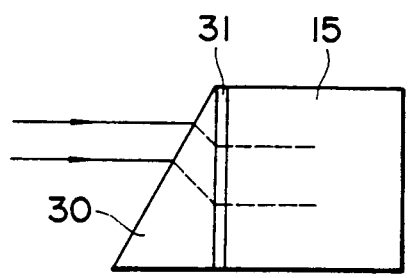
FIG. 3 is a schematic illustration showing a modification of the structure shown in FIG. 2.

As described above, in accordance with this aspect of the present invention, since the diffraction grating 31 is fixedly mounted on the output surface of the prism 30 so as to direct an output light beam in parallel with the input light beam, it may be provided in an optical pick-up device in place of the pair of triangular prisms 13 and 14. Since the present beam reshaping unit has a single piece structure, its mounting is greatly simplified and the alignment with the beam splitter 15 is also significantly eased. In particular, the present beam reshaping unit may be combined with the beam splitter 15 as shown in FIG. 3, in which case the overall structure of the optical pick-up device may be made even simpler and smaller.

Figure 8:
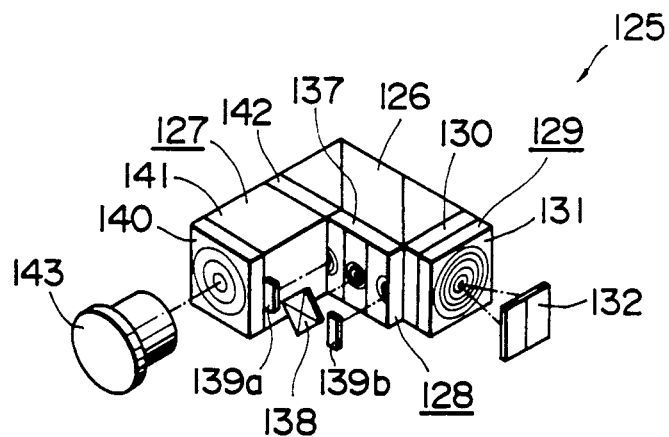
FIG. 8 is a schematic illustration showing an integrated stationary optical system of a split-type optical pick-up device for use in an optical information recording/reproducing apparatus constructed in accordance with another embodiment of the present invention.

Referring now to FIG. 8, there is schematically shown an integrated stationary optical system 125 of an optical pick-up device for use in an optical information recording/reproducing apparatus constructed in accordance with another embodiment of the present invention. It is to be noted that the stationary optical system 125 shown in FIG. 8 is to be used in a split-type optical pick-up device as illustrated in FIG. 4. Thus, although not shown specifically, it should be understood that the stationary optical system of FIG. 8 is provided to be fixed in position relative to an optical disc, and there is provided a movable optical system associated with this stationary optical system and movable relative to the optical disc. Thus, when the present stationary optical system 125 is to be applied to the structure shown in FIG. 4, it will be mounted on the support plate 6.

The stationary optical system 125 shown in FIG. 8 includes an integrated double beam splitter 126 which is equivalent to a combination of the two beam splitters 15 and 16 provided in the structure shown in FIG. 4. In the integrated double beam splitter 126, three optical systems, i.e., illumination optical system 127, servo optical system 128 and opto-magnetic information detecting optical system 129, are defined, and various planar type optical elements defining these three optical systems are fixedly attached to the integrated double beam splitter 126.

Figure 9:
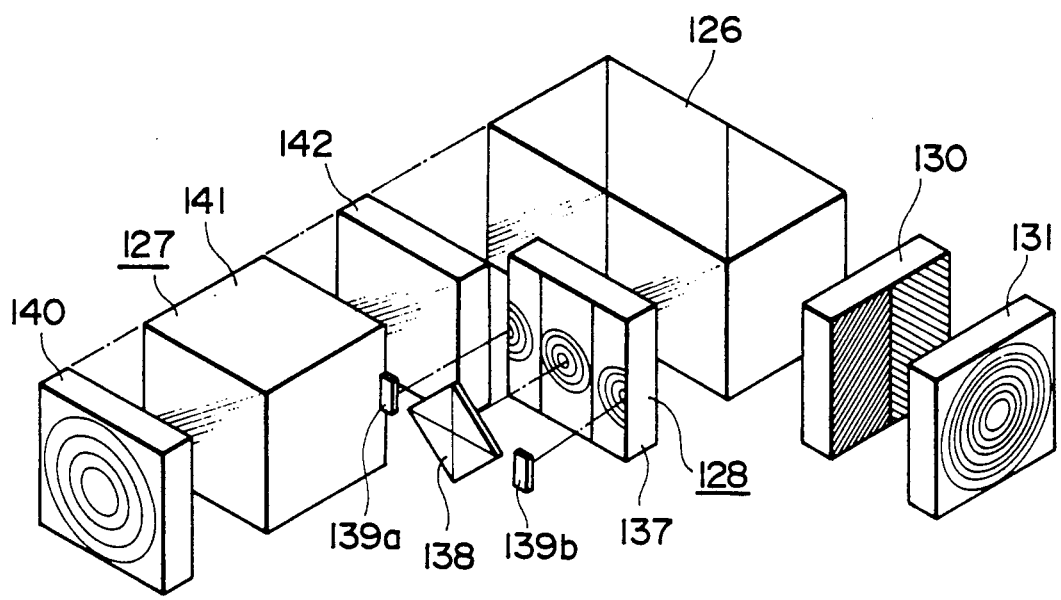
FIG. 9 is an exploded view showing on a somewhat enlarged scale the structure shown in FIG. 8.

That is, the opto-magnetic information detecting optical system 129 corresponds in function to the opto-magnetic information detecting optical system 10 of FIG. 4 (which is defined by optical elements 16, 21, 22, 23 and 24), and it includes a polarization separation element 130 and a plate-shaped focusing element 131 which are fixedly attached one on top of another on one end surface of the integrated double beam splitter 126. As shown in FIG. 9, the polarization separation element 130 has a two-division orthogonal type diffraction grating structure which is comprised of two diffraction gratings of minute pitch arranged side-by-side extending approximately perpendicular to each other with the merging line located substantially at the optical axis of the double beam splitter 126. Thus, this polarization separation element 130 provides a function similar to that of the Wollaston prism 22 in the structure shown in FIG. 4. This polarization separation element 130 is directly formed on the integrated double beam splitter 126, and thus it is not necessary to provide an optical element corresponding to the half wavelength plate 21 for adjusting the polarization condition. In addition, as the plate-shaped focusing element 131, use may be made of a holographic lens, Fresnel lens or the like as shown in FIG. 9. Such an opto-magnetic information detecting optical system 129 has a function of focusing the light passing through the integrated double beam splitter 126 onto a two-division light-receiving device 132, which corresponds to the light-receiving device 24 in FIG. 4, so as to detect the polarized component which has been separated from the light reflecting from the optical disc 1.

Figure 10:
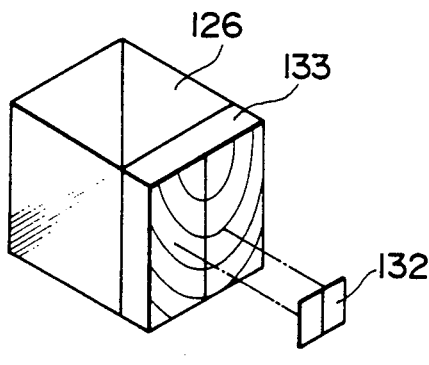
FIG. 10 is a schematic, perspective view showing an alternative embodiment of an opto-magnetic information detecting device which may be provided in the structure shown in FIG. 8.
Figure 11:
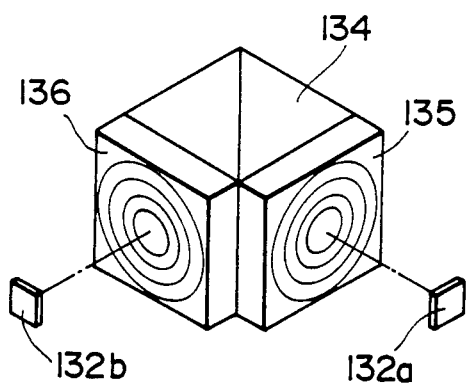
FIG. 11 is a schematic, perspective view showing a further alternative embodiment of an opto-magnetic information recording device which may be provided in the structure shown in FIG. 8.

As an alternative structure, the polarization separation element 130 comprised of diffraction gratings and the plate-shaped focusing element 131 may be formed integrally on opposite side surfaces of a single substrate. That is, the elements 130 and 131 may be combined by flipping the element 130 upside down and affixing the thus flipped element 130 to the element 131. As a further alternative embodiment, as shown in FIG. 10, the opto-magnetic information detecting optical system 129 may be comprised of a polarization separation and focusing element 133 which includes a pair of curved diffraction gratings arranged side-by-side symmetrically with respect to the center line in alignment with the optical axis of the integrated double beam splitter 126. In this case, since the diffraction gratings formed on the element 133 are curved, the light passing therethrough is not only split into two beams, but also the thus split beams are focused onto the respective light-receiving elements of the light-receiving device 132. FIG. 11 illustrates another alternative structure in which an additional beam splitter 134 is mounted at the end of the integrated double beam splitter 126 for splitting the beam output from the integrated double beam splitter 126 into two beams and a pair of gratings 135 and 136 having differing transmission and diffraction rates depending on the polarization angle is attached to two output surfaces of the additional beam splitter 134. And, the light beams thus split are focused onto respective light-receiving elements 132a and 132b by means of the focusing diffraction gratings 135 and 136, respectively.

The stationary optical system 125 of FIG. 8 also includes the servo optical system 128 which corresponds in function to the servo optical system 9 of FIG. 4, including optical elements 16, 17, 18, 19 and 20. In the structure shown in FIG. 4, the servo optical system 9 has a knife edge structure; on the other hand, in the present embodiment, the servo optical system 128 has a structure for utilizing an astigmatism method. In the illustrated embodiment, the servo optical system 128 includes a plate-shaped focusing holo lens 137 fixedly attached to one side surface of the integrated double beam splitter 126. The holo lens 137 has three sections for outputting three light beams, and a four-division light-receiving device 138 for detecting a focusing error signal is disposed to receive the light beam output from the center section of the holo lens 137 and a pair of left and right light-receiving elements 139a and 139b for detecting a tracking error signal is disposed on both sides of the four-division light-receiving device 138 for receiving light beams output from the side sections of the holo lens 137. As shown in FIGS. 8 and 9, each of the three sections of the holo lens 137 has a grating of a predetermined shape.

The stationary optical system 125 also includes the illumination optical system 127 which corresponds in function to the illumination optical system 8 of the structure shown in FIG. 4, including those optical elements 12, 13, 14 and 15. In the illustrated embodiment, the illumination optical system 127 has a three-beam structure corresponding to the structure of the servo detecting optical system 128 in which a focus error detecting operation is carried out by an astigmatism method using three beams. In the illustrated embodiment, the illumination optical system 127 includes a plate-shaped focusing element 140, a beam shaping element 141 and a beam splitting diffraction grating 142 for splitting a laser beam into three beams, which are attached to an input end surface of the integrated double beam splitter 126 overlying one on top of another. The plate-shaped focusing element 141 receives a laser beam emitted from the semiconductor laser 143 and has the beam collimated and thus it corresponds in function to the collimator lens 112 of the structure shown in FIG. 4. And, the plate-shaped focusing element 141 may be comprised of a holo lens of concentric circular gratings, Fresnel lens or the like, as shown in FIG. 9. The beam shaping element 141 serves to shape the elliptic beam emitted from the semiconductor laser 143 into a circular beam, and thus it corresponds in function to the pair of prisms 13 and 14. The beam shaping element 141 may also be constructed by gratings, holo gratings, or the like. The beam splitting diffraction grating 142 serves to split the laser beam from the semiconductor laser 143 into three beams and it may be comprised of gratings or the like.

Figure 12:
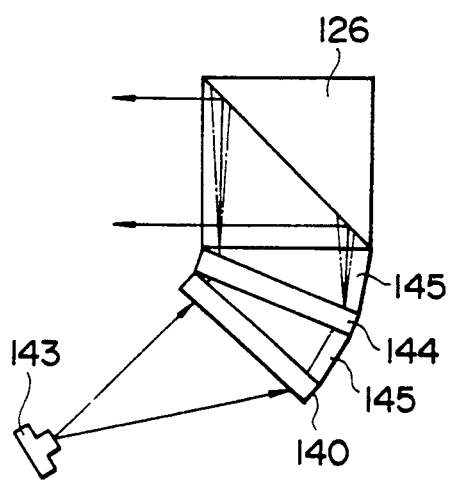
FIGS. 12 through 14 are schematic illustrations showing several alternative embodiments of an illumination optical system each of which may be provided in the structure shown in FIG. 8.

FIG. 12 illustrates an alternative embodiment of the illumination optical system 127 whose optical path is angled or curved in contrast to the linear optical path of the illumination optical path of the embodiment shown in FIGS. 8 and 9. That is, in the structure shown in FIG. 12, the curved illumination optical path shown in FIG. 12 includes a pair of plate-shaped focusing elements 140 and 144 with a triangular spacer 145 of a transparent material sandwiched therebetween so that the plate-shaped focusing elements 140 and 144 are inclined at a predetermined angle relative to each other. The focusing element 144 has a holographic grating structure which serves to divide and shape the single laser beam from the semiconductor laser 143 into three separate beams, each circular in cross section. That is, the focusing element 144, in effect, serves as an element for dividing a single beam into three beams and shaping each of the divided beams into a beam having a circular cross section. Such a focusing element 144 may be formed, for example, by using a two light flux interference method.

Figure 13:
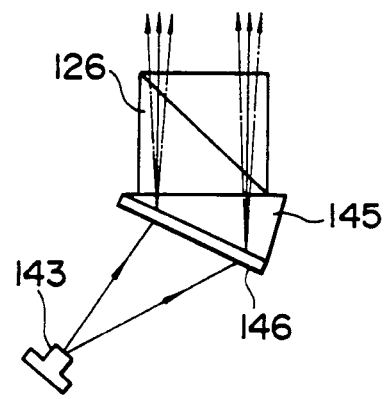
Figure 14:
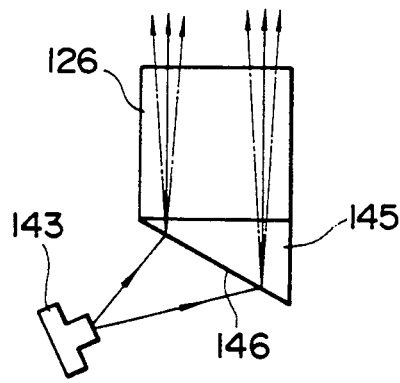

FIG. 13 illustrates another embodiment of the illumination optical system 127 which includes a planar type focusing element 146 having a holographic grating structure to possess three functions of a beam splitting function for splitting a laser beam emitted from the semiconductor laser into three beams, a collimating function of collimating the laser beam and a beam shaping function of shaping the laser beam so as to have a desired cross sectional shape. FIG. 14 shows a still another embodiment of the illumination optical system 127 in which a triangular prism 145 of a transparent material has an inclined, input surface on which a grating is directly formed to define a focusing element 146.

As described above, in accordance with this aspect of the present invention, a single beam emitted from the semiconductor laser 143 is split into three beams which are then lead to impinge upon the recording surface of the optical disc 1, and the light beams reflected from the optical disc 1 are used to detect a focusing error signal and a tracking error signal in accordance with an astigmatism method. The present stationary optical system 125 to be used in a split-type optical pick-up device has an integrated, one-unit structure comprised of the illumination optical system 127, servo detecting optical system 128 and information detecting optical system 129, each of which includes various plate-shaped optical elements combined in a face-to-face relation. As a result, the present stationary optical system can be significantly small in size, light in weight and low at cost. Besides, all of the components are put together in a face-to-face relation, no adjustment among components is necessary and, thus, stability and high precision in positioning can be secured. The present stationary optical system provides an optical pick-up device having high reliability in operation. In addition, since all of the opposed surfaces of the two adjacent elements are in contact, loss of light transmission between the two adjacent elements by reflection is minimized, so that the overall use rate of light is also significantly enhanced.

Another aspect of the present invention will now be described. In accordance with this aspect of the present invention, there is provided a stationary optical system for use in a split-type optical pick-up device in which a light beam from a light source is led to impinge upon an optical disc and the light reflected from the optical disc is used to detect, in accordance with a knife edge method, a focusing error signal and a tracking error signal for providing a servo function of a movable optical system of the optical pick-up device. The stationary optical system includes an integrated double beam splitter as a common element and also an illumination optical system comprised of a plate-shaped focusing element, a beam shaping diffraction grating and a transparent element, a servo detecting optical system comprised of a plate-shaped focusing element and a knife edge forming diffraction grating, and an information detecting optical system comprised of a polarization separation element and a plate-shaped focusing element. All of the elements are combined in a face-to-face relation and fixedly attached to the integrated double beam splitter, so that the present stationary optical system defines an integrated, one-piece unit.

Figure 15:
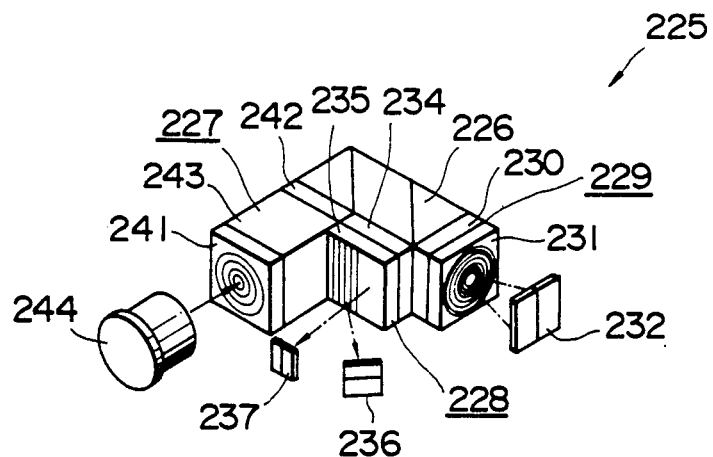
FIG. 15 is a schematic illustration showing an integrated stationary optical system of a split-type optical pick-up device for use in an optical information recording/reproducing apparatus constructed in accordance with a further embodiment of the present invention.
Figure 16:
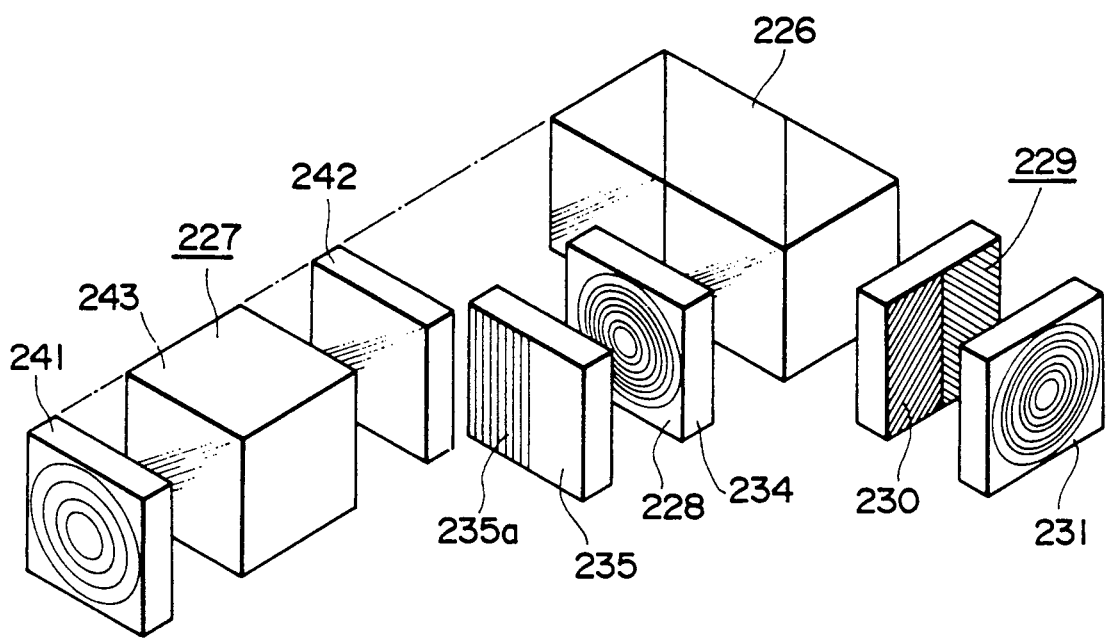
FIG. 16 is an exploded view showing on a somewhat enlarged scale the structure shown in FIG. 15.

Referring now to FIGS. 15 and 16, there is schematically shown a stationary optical system 225 for use in a split-type optical pick-up device constructed in accordance with this aspect of the present invention. It is to be noted that although not shown specifically in FIG. 15, the present stationary optical system 225 constitutes part of a split-type optical pick-up device for use in an optical information recording/reproducing apparatus, which device includes two parts, i.e., a movable optical system which is movable relative to an optical disc and a stationary optical system which is stationary relative to the optical disc. In FIG. 15, an associated movable optical system is not shown; however, the present stationary optical system 225 may, for example, be used in combination with such a movable optical system 5 shown in FIG. 4, though the present stationary optical system 225 may also be used with any other type of movable optical system. When used with the movable optical system 5 shown in FIG. 4, the present stationary optical system 225 is mounted on the support plate 6.

As shown, the present stationary optical system 225 includes an integrated double beam splitter 226 which corresponds to an integration or combination of the two polarization beam splitters 15 and 16 in the structure shown in FIG. 4. The integrated double beam splitter 226 defines a common and basic structure of the present stationary optical system 225 which includes three sections, i.e., an illumination optical system 227, a servo detecting optical system 228 and an opto-magnetic information detecting optical system 229.

The opto-magnetic detecting optical system 229 corresponds in function to the opto-magnetic information detecting optical system 10 of FIG. 4, which includes such optical elements as 16, 21, 22, 23 and 24, and it includes a polarization separation element 230 and a plate-shaped focusing element 231, which are fixedly attached to one end surface of the integrated double beam splitter 226 in a face-to-face relation. The polarization separation element 230 may have a two division orthogonal diffraction grating structure in which two diffraction gratings of minute pitch are arranged side-by-side with their gratings extending approximately orthogonal to each other and the merging line located approximately at the optical axis of the integrated double beam splitter 226. The polarization separation element 230 corresponds in function to the Wollaston prism 22 in the structure shown in FIG. 4. The polarization separation element 230 is directly formed on the integrated double beam splitter 226 so that it is not necessary to provide an optical element corresponding to the half wavelength plate 21 for adjusting the polarization condition. In addition, as shown in FIG. 16, as the plate-shaped focusing element 231, use is made of a holo lens, Fresnel lens or the like. The opto-magnetic information detecting optical system 229 serves to focus the light beam from the integrated double beam splitter 226 onto a two-division light-receiving device 232, which corresponds to the element 24 in FIG. 4, so as to detect a polarized light component separated from the light reflecting from the optical disc 1.

Figure 17:
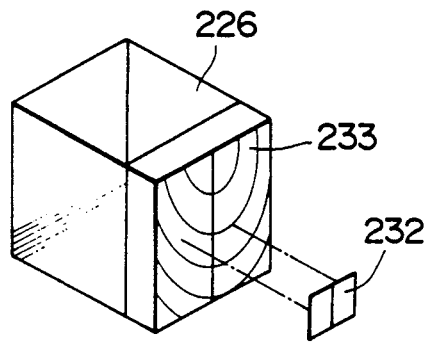
FIG. 17 is a schematic, perspective view showing an alternative embodiment of an opto-magnetic information detecting device which may be provided in the structure shown in FIG. 15.

As an alternative structure, the polarization separation element 230 and the plate-shaped focusing element 231 may be formed on the opposite surfaces of the same substrate. In addition, as shown in FIG. 17, use may be made of a polarization separation and focusing element 233 in place of the combination of the polarization separation element 230 and the plate-shaped focusing element 231. The polarization separation and focusing element 233 has both functions of separating a polarized light component and focusing the light and it is comprised of a pair of curved gratings which are arranged side-by-side with its dividing line located at the optical axis of the integrated double beam splitter 226.

The servo detecting optical system 228 corresponds in function to the servo detecting optical system 9 of FIG. 4, which includes optical elements 16, 17, 18, 19 and 20, and it includes a plate-shaped focusing element 234 and a knife edge forming diffraction grating element 235 which are fixedly attached to a predetermined position of the integrated double beam splitter 226 one on top of another in a face-to-face relation. As the plate-shaped focusing element 234, use may be made of such an element as holo lens of concentric circular grating structure, Fresnel lens or the like. The knife edge forming diffraction grating element 235 corresponds in function to the knife edge prism 18 in FIG. 4, and it is formed on the left-hand half of the surface of a plate-shaped substrate. As shown in FIG. 15, the light is divided into two beams by the knife edge forming grating element 235 and one of them impinges upon a tracking error detecting light-receiving device 236, which corresponds to element 19 in FIG. 4, with the other beam impinging upon a focus error detecting light-receiving device 237, which corresponds to element 20 in FIG. 4.

Figure 18:
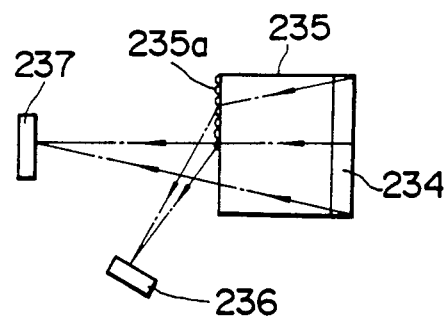
FIG. 18 is an illustration which is useful for understanding the principle of operation of the present embodiment shown in FIG. 15.

With this servo error detecting optical system 228, as shown in FIG. 18, both tracking and focusing errors may be detected in accordance with a knife edge method. That is, the light propagating from the integrated double beam splitter 226 to the plate-shaped focusing element 234 receives a focusing action by the plate-shaped focusing element 234 and enters into the knife edge forming diffraction grating element 235. And, that portion of the light which passes through a knife edge diffraction grating 235a of the knife edge forming diffraction grating element 235 is diffracted toward the tracking error detecting light-receiving device 236 where a tracking error signal is produced. On the other hand, that portion of the light which passes through the remaining half of the end surface of the knife edge forming diffraction grating element 235 where no grating is provided is not diffracted and is focused onto the focus error detecting light-receiving device 237 where a focusing error signal is produced. In this manner, the diffraction grating 235a which is provided on a portion of the end surface of the knife edge forming diffraction grating element 235 provides a knife edge function.

Figure 19:
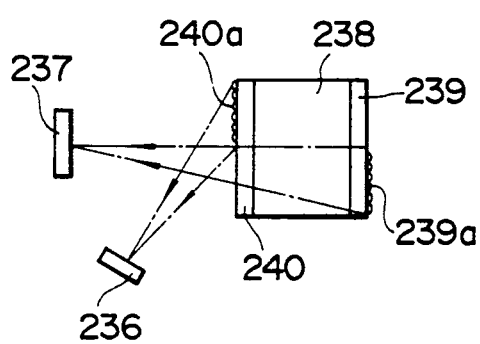
FIG. 19 is an illustration showing an alternative embodiment of the structure shown in FIG. 18.

As an alternative structure, as shown in FIG. 19, the servo detecting optical system 228 may be comprised of a front plate-shaped focusing element 239 having a concentric, circular diffraction grating 239a formed in the bottom half of its surface, a transparent plate 238 and a rear plate-shaped focusing element 240 having a concentric, circular diffraction grating 240a formed in the top half of its surface.

The illumination optical system 227 corresponds in function to the illumination optical system 8 of FIG. 4, which includes optical elements 12, 13, 14 and 15, and it includes a plate-shaped focusing element 241, a beam shaping diffraction grating element 242 and a transparent member 243, which are fixedly attached to a predetermined portion of the integrated double beam splitter 226 in a face-to-face relation. The plate-shaped focusing element 241 receives a laser beam, which is divergent, emitted from a semiconductor laser 244 as a light source and converts it into a collimated laser beam, and thus it corresponds in function to the collimator lens 12 in FIG. 4. As the plate-shaped focusing element 241, use may be made of such an element as a holo lens of a concentric, circular grating, Fresnel lens or the like, as shown in FIG. 16. The beam shaping diffraction grating element 242 serves to shape the laser beam having an elliptic cross sectional shape into a laser beam having a circular cross sectional shape, and it corresponds in function to the prisms 13 and 14 in FIG. 4. As the beam shaping diffraction grating element 242, use may also be made of a grating, holo grating or the like. The transparent member 243 serves as a spacer between these optical elements 241 and 242 and it may be comprised of such a transparent material as glass, plastic or the like.

Figure 20:
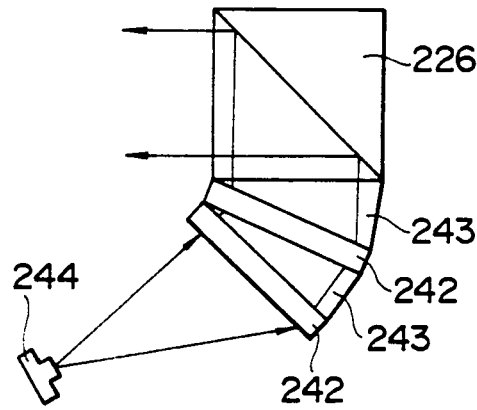
FIGS. 20 through 22 are illustrations showing several alternative embodiments of an illumination optical system each of which may be provided in the structure shown in FIG. 15.
Figure 21:
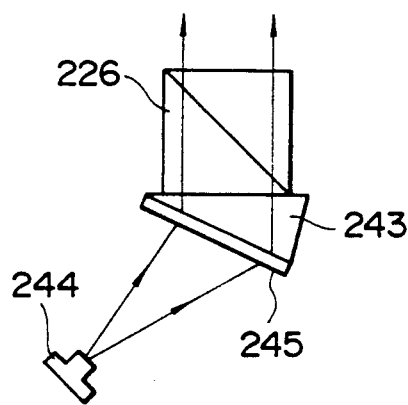
Figure 22:
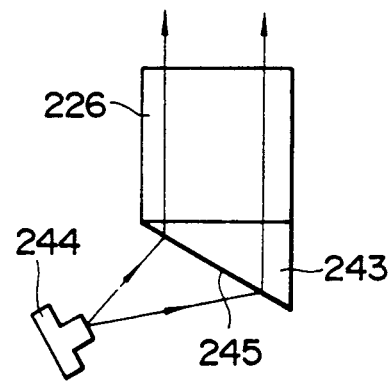

The illumination optical system 227 shown in FIGS. 15 and 16 is of the linear type and thus it extends straight. However, the illumination optical system 227 should not be limited only to such a linear type, but it may be curved or angled. For example, FIG. 20 shows an alternative structure in which the plate-shaped focusing element 241 and the beam shaping diffraction grating element 242 are arranged at predetermined angles with respect to the semiconductor laser 244, respectively. FIG. 21 shows a further alternative structure in which use is made of a plate-shaped focusing and beam shaping element 245 including a grating for collimating and shaping a laser beam at the same time. Furthermore, FIG. 22 shows a still further alternative structure in which a focusing and beam shaping grating 245 is directly formed on the input surface of the triangular transparent element 243.

As described above, in accordance with this aspect of the present invention, a single beam emitted from the semiconductor laser 244 is guided to impinge upon the optical disc 1 and the light reflecting from the optical disc 1 is used for detecting both of tracking and focusing errors using a knife edge method. Planar or plate-shaped optical elements are used to construct each of the illumination, servo detecting and opto-magnetic information detecting optical systems 227, 228 and 229, respectively. Accordingly, the present stationary optical system may be made compact in size, light in weight and low at cost. Besides, since almost all of the optical elements are plate-shaped and they are laid one on top of another in a face-to-face relation when assembling, it is not necessary to adjust positional relation between adjacent elements once assembled. Thus, the present stationary optical system is highly reliable in operation. In addition, since the opposite surfaces of the two adjacent optical elements are virtually in surface contact, there is less reflection of light between the elements so that the use rate of light is also significantly enhanced.

Figure 29:
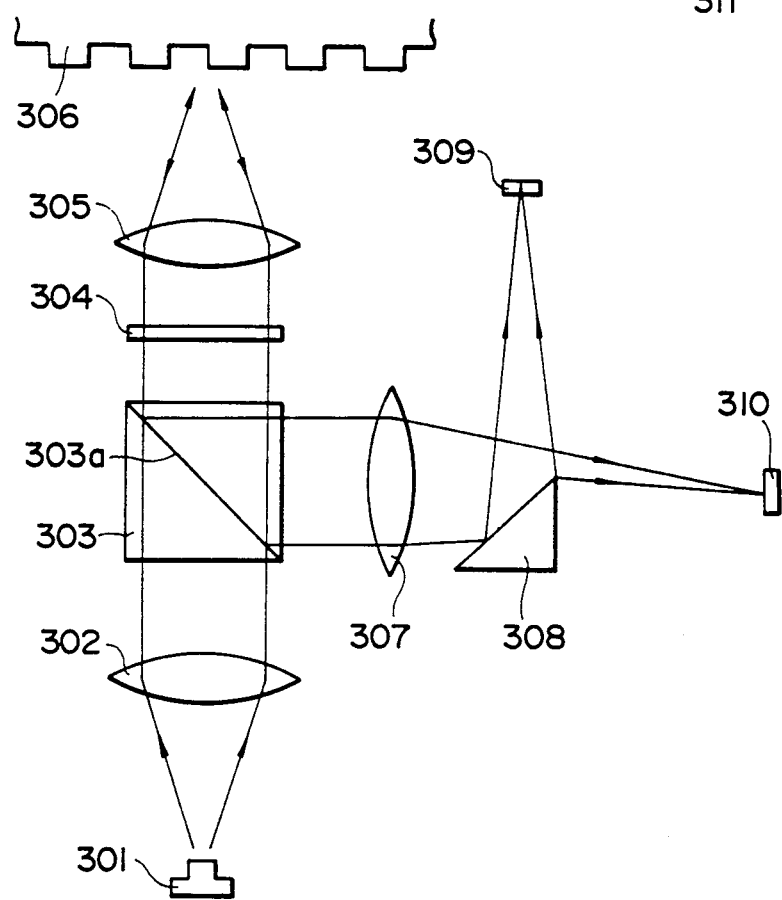
FIG. 29 is a schematic illustration showing a typical prior art optical pick-up device for use in an optical information recording/reproducing apparatus.

A still further aspect of the present invention will now be described. FIG. 29 illustrates another typical prior art optical pick-up device for use in an optical information recording/reproducing apparatus. The optical pick-up device shown in FIG. 29 is a one-unit type as different from the split type optical pick-up device shown in FIG. 4. That is, in the optical pick-up device shown in FIG. 29, the optical system for guiding a laser beam to an optical disc 306 and guiding the light reflected from the optical disc 306 to a detecting device, which typically includes detecting units for tracking and focusing error detection and for information signal detection, is constructed as one unit. As shown in FIG. 29, a linear polarization light beam emitted from a semiconductor laser 301 serving as a light source passes through a collimator lens 302, a polarization beam splitter 303 and a quarter wavelength plate 304 to become a circular polarization light beam which is focused onto a recording surface of an optical disc 306 serving as an information recording medium. And, the light reflected from the optical disc 306 again passes through the objective lens 305 this time in the reversed direction and then passes through the quarter wavelength plate 304 so that the reflecting light again becomes a linear polarization light beam which is rotated over 90° after passing through the quarter wavelength plate 304 in the reversed direction. As a result, the reflected light is reflected by a polarization plane 303a in the polarization beam splitter 303 to be separated away from the incident laser beam coming from the semiconductor laser 301. The reflected light thus reflected at the polarization plane 303a then passes through a detection lens 307 to be subjected to focusing action. The light being converged is then partly deflected by a knife edge 308 and the deflected portion of the light impinges upon a track error detecting light-receiving device 309. On the other hand, that portion of the light which is not deflected by the knife edge 308 impinges upon a focus error detecting light-receiving device 310. In this structure, the knife edge 308 divides the light into two beams, i.e., one for focusing error detection and the other for tracking error detection. This is true not only for the type of reading the intensity of the reflecting light, but also for the type of reading the degree of Kerr rotation such as in the case of using an optical disc.

However, in such a prior art knife edge structure, fine adjustments were typically required in mounting of the knife edge 308, and thus it was not suited for mass production. In addition, in the prior art structure, such optical elements as polarization beam splitter 303, detection lens 307 and knife edge 308 are located spaced apart from each other and thus reflection and scattering of light between these spaced apart optical elements is appreciable so that the use rate of light is relatively low. In order to avoid such reflection and scattering, each of the optical elements must be provided with an anti-reflection coating, which tends to push up the cost. Besides, in the prior art knife edge structure, when the focal position is shifted, the amount of light received by the tracking error detecting light-receiving device 309 varies. Such a change in the amount of received light is undesirable because a tracking error is detected on the basis of a light distribution in the cross section of light beam.

This aspect of the present invention is addressed to solve the above-described particular problem and thus provides an improved optical pick-up device of the knife edge type simple in structure, easy to manufacture and to adjust, and capable of detecting a tracking error without being adversely affected by changes in the focal position.

Referring now to FIG. 23, there is shown an optical pick-up device constructed in accordance with one embodiment of this aspect of the present invention. The present optical pick-up device shown in FIG. 23 has a basic structure which is similar to that of the prior art optical pick-up device shown in FIG. 29, and thus like elements are indicated by like numerals. The present optical pick-up device of FIG. 23 differs from the device of FIG. 29 in the provision of a grating knife edge optical system including a pair of first and second focusing gratings 311 and 312 in place of a combination of the detection lens 307 and the knife edge 308. In the structure shown in FIG. 23, the pair of first and second focusing gratings 311 and 312 are integrally formed on the opposite side surfaces of a rectangular block-shaped transparent member 313. The first focusing grating 311 is formed in the lower half of the input surface of the transparent member 313, and the second focusing grating 312 is formed in the upper half of the output surface of the transparent member 313. Thus, when the light reflected from the optical disc 306 is reflected by the polarization surface 303a, a lower half portion of the light is diffracted by the first focusing grating 311 and the remaining portion of the light is diffracted by the second focusing grating 312. The first and second focusing gratings 311 and 312 have a similar structure. More specifically, each of the first and second focusing gratings 311 and 312 is preferably formed as a focusing (convergent) holographic grating which is curved as shown in FIG. 25 so as to provide a focusing function. Such a grating may be formed either as a refractive index distribution type or as a surface relief type. When it is formed as a surface relief type, the cross sectional shape of the grating is as shown in FIG. 26.

Figures 27A, 27B:
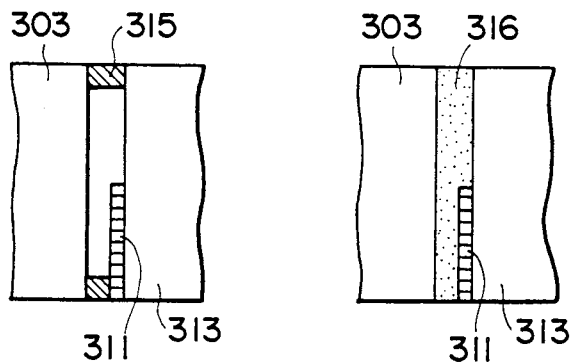
FIGS. 27a and 27b are schematic illustrations showing the structure of the coupling section between the two beam splitters.

As shown in FIG. 23, a focus error detecting light-receiving device 310 is disposed at a focal position of the light diffracted by the first focusing grating 311. It is to be noted that the second focusing grating 312 extends downward into and almost to the center of the light path for the light diffracted by the first focusing grating 311, so that the bottom edge of the second focusing grating 312, in effect, serves as a knife edge. Thus, the second focusing grating 312 serves to block part of the light diffracted by the first focusing grating 311. On the other hand, a tracking error detecting light-receiving device 309 is disposed at a focal position for the light diffracted by the second focusing grating 312. In this manner, the transparent member 313 provided with the first and second focusing gratings 311 and 312 on its opposite surfaces is fixedly and integrally attached to the output surface of the polarization beam splitter 303 through a coupling section 314. FIG. 27a shows one example of a coupling member 315 provided in the coupling section 314, and FIG. 27b shows an alternative structure in which the transparent member 313 is fixedly attached to the polarization beam splitter 303 using a transparent adhesive agent 316 in the coupling section 314. Use may be made of a thermosetting adhesive agent, electromagnetic setting adhesive agent or the like as the adhesive agent 316.

As described above, in the illustrated embodiment, a knife edge assembly including the transparent block 313 and the first and second focusing gratings 311 and 312 fixedly attached to the block 313 is fixedly attached to the polarization beam splitter 303. Thus, the number of separate optical components is reduced as compared with the prior art structure shown in FIG. 29 so that the assembly and adjustment is significantly eased in the present optical pick-up device. Besides, the amount of light to be applied to the tracking error detecting light-receiving device 309 is only influenced by the second focusing grating 312, and thus even if there is a shift in focal position, its effect is not felt at the tracking error detecting light-receiving device 309. As a result, it is not necessary to provide a correction circuit in the tracking error detecting system and thus the tracking error detecting circuit may be simplified in structure.

Figure 28:
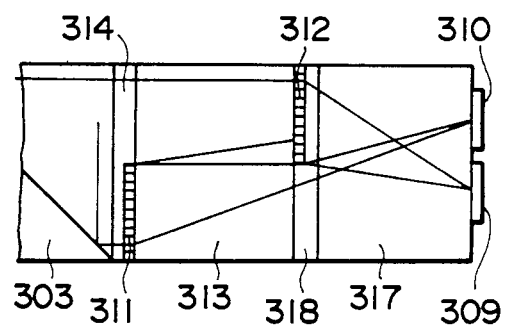
FIG. 28 is a schematic illustration showing a modification of the structure shown in FIG. 23.

FIG. 28 shows another embodiment of this aspect of the present invention, which is similar in many respects to the previously described embodiment of FIG. 23 excepting the fact that the first and second focusing gratings 311 and 312 are so structured to have respective focal distances that both of the focusing and tracking error detecting light-receiving devices 309 and 310 may be disposed on the same surface of a transparent member 317 which is fixedly and integrally attached to the transparent member 313 through a coupling section 318. With this structure, both of the focusing and tracking error detecting light-receiving devices 309 and 310 are also integrated with the polarization beam splitter 303 through the grating knife edge assembly 313.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A split-type optical pick-up device for use in an optical information recording/reproducing apparatus, comprising:

a light source for emitting a light beam;

detecting means; and an optical system for first guiding said light beam to a recording medium to impinge thereon and to be reflected thereby and then guiding the light beam reflected from said recording medium to said detecting means, said optical system including a movable optical system which is movable relative to said recording medium and a stationary optical system which is fixed in position with respect to said recording medium and has an integrated one-piece structure, comprising a multiplicity of optical elements which are in contact with and fixed relative to each other;

wherein said stationary optical system includes: an integrated double beam splitter having two polarization reflection surfaces; a first optical unit fixedly attached to a first position of said splitter, said first optical unit including a plate-shaped focusing element for collimating said light beam received from said light source, a beam shaping element for shaping said collimated light beam into a shaped light beam having a substantially circular cross sectional shape and a beam dividing element for dividing said shaped light beam into three light beams to be guided to said recording medium through said splitter and said movable optical system; a recorded information detecting device; a second optical unit fixedly attached to a second position of said splitter for guiding the light passing through said two polarization reflection surfaces of said splitter to said recorded information detecting device; a servo error detecting means; and a third optical unit fixedly attached to a third position of said splitter for guiding the light passing through one of said two polarization reflection surfaces and reflected by the remaining of said two polarization reflection surfaces to said servo error detecting means.

2. The device of claim 1, wherein said third optical unit includes three holo lenses and said servo error detecting means includes a focusing error detecting device which receives light output from one of said three holo lenses and a tracking error detecting device which receives light output from the remaining two of said three holo lenses.

3. The device of claim 2, wherein said three holo lenses are arranged in a line, spaced apart from each other and said focusing error detecting device receives the light output from one of the three holo lenses which is located at the center with said tracking error detecting device receiving the light output from the remaining two holo lenses located at left and right.

4. The device of claim 3, wherein said focusing error detecting device has a 4-segment light-receiving device and said tracking error detecting device includes a pair of left and right light-receiving elements which receive the light output from the left and right holo lenses, respectively.

5. The device of claim 1, wherein said second optical system includes a plate-shaped polarization separation element and a plate-shaped focusing element which are fixedly attached together and also to said splitter in a face-to-face relation.

6. The device of claim 1, wherein said second optical system includes a plate-shaped polarization separation element provided with a curved grating having a focusing function.

7. The device of claim 1, wherein said second optical unit includes a plate-shaped focusing element and a knife edge forming diffraction grating for diffracting part of the light passing through said plate-shaped focusing element in a first direction other than a second direction of advancement of the light passing through said plate-shaped focusing element.

8. The device of claim 7, wherein said servo error detecting means includes a focusing error detecting device disposed to receive the light advancing in said second direction and a tracking error detecting device disposed to receive the light advancing in said first direction.

9. The device of claim 8, wherein said knife edge forming diffraction grating is formed on a transparent member which is fixedly attached to said plate-shaped focusing element which in turn is fixedly attached to said splitter.

10. A split-type optical pick-up device for use in an optical information recording/reproducing apparatus using an optical recording medium (1), comprising:
   a moving optical system which moves relative to an axis of the optical recording medium;
   a stationary optical system (125) which is fixed relative to said axis of the optical recording medium and is optically coupled to the moving optical system and comprises optical elements which are in contact with and fixedly attached relative to each other;
   wherein the stationary optical system generates and guides light to the moving optical system, which in turn guides the light to the recording medium from which the light is reflected and guided through the moving optical system back to the stationary optical system;
   said stationary optical system comprising:
     a light source (143) emitting a light beam;
     an integrated double beam splitter (126) having two polarization reflection surfaces;
     an illuminating optical unit (127) which is fixedly attached relative to the splitter and includes a plate-shaped focusing element (140) collimating the light beam emitted from the light source, a beam shaping element (141) receiving and shaping the collimated light beam into a shaped light beam having a substantially circular cross sectional shape and a beam dividing element (142) dividing the shaped light beam into three light beams guided to the splitter to be guided through the splitter and the movable optical system to the recording medium to be reflected thereby and guided through the moving optical system back to the splitter as reflected light;
     a recorded information detecting device (132);
     an information detecting optical unit fixedly attached relative to the splitter to guide reflected light passing through the two polarization reflection surfaces of the splitter to the recorded information detecting device;
     a servo error detecting device (138, 139a, 139b); and
     a servo optical unit (128) fixedly attached relative to the splitter to guiding reflected light passing through one of the two polarization reflection surfaces of the splitter and reflected by the remaining of the two polarization reflection surfaces of the splitter to the servo error detecting means.

* * * * *